United States Patent [19]

Bloom

[11] 4,304,476
[45] Dec. 8, 1981

[54] PARTIAL INFRARED FILTER EXPOSURE COMPENSATION APPARATUS

[75] Inventor: Richard M. Bloom, N. Chili, N.Y.

[73] Assignee: Eastman Kodak Company, Rochester, N.Y.

[21] Appl. No.: 199,000

[22] Filed: Oct. 22, 1980

Related U.S. Application Data

[63] Continuation of Ser. No. 80,374, Oct. 1, 1979, abandoned.

[51] Int. Cl.³ .................. G03B 7/083; G03B 15/03
[52] U.S. Cl. .................................. 354/49; 354/59; 354/126
[58] Field of Search ............... 354/27, 32–34, 354/42, 49, 59, 60 F, 126, 128, 139, 149, 195, 29; 356/225

[56] References Cited

U.S. PATENT DOCUMENTS

| | | | |
|---|---|---|---|
| 3,205,802 | 9/1965 | Wareham | 354/60 F X |
| 3,455,218 | 7/1969 | Eagle et al. | 354/27 |
| 4,003,062 | 1/1977 | Galbraith, Jr. | 354/59 X |
| 4,040,070 | 8/1977 | Hochreiter et al. | 354/49 X |
| 4,059,836 | 11/1977 | Hochreiter et al. | 354/29 |

*Primary Examiner*—L. T. Hix
*Assistant Examiner*—W. J. Brady
*Attorney, Agent, or Firm*—D. P. Monteith

[57] ABSTRACT

A camera includes (1) a socket for detachably receiving a flashbulb, (2) a sensing member, coupled to the socket, for sensing a flashbulb, and (3) a photosensor, responsive to visible light and infrared (IR), for controlling an exposure in accordance with the visible light and IR passing along a light path to the photosensor during an exposure interval. A full IR-attenuating filter, responsive to the sensing member, is normally biased into alignment with the light path for effectively blocking IR from impinging upon the photosensor when an exposure is made solely in ambient light, and is positioned outside the light path when a flash exposure is made. A partial IR-attenuating filter (800 nanometers and above), coupled to the sensing member, is located in the optical path while a flashbulb is in the socket to allow the prevailing IR between 700 and 800 nanometers to influence the control of a flash exposure.

4 Claims, 5 Drawing Figures

PARTIAL INFRARED FILTER EXPOSURE COMPENSATION APPARATUS

This is a continuation of application Ser. No. 80,374, filed Oct. 1, 1979, abandoned.

CROSS-REFERENCE TO A RELATED APPLICATION

Reference is hereby made to U.S. patent application Ser. No. 80,375 entitled "Infrared Filter Exposure Compensation Apparatus" by S. Daniels, filed on Oct. 1, 1979, abandoned.

BACKGROUND OF THE INVENTION

1. Field of the Invention

This invention relates to a camera having a photosensor for controlling a photographic exposure, and, more particularly, to a control mechanism for regulating infrared (IR) impinging upon the photosensor to refine the control of a flash exposure.

2. Description of the Prior Art

Cameras having a photosensor for regulating an exposure are well known in the photographic art. The photosensor produces an amount of current that is related to light impinging upon it. When a camera shutter is open, the current charges a capacitor. When the capacitor is charged to a predetermined voltage representing a desired exposure, an exposure terminating signal is produced. In the case of a chemical flash exposure, an electromagnet, responsive to the exposure termination signal, is actuated to close the shutter. In the case of an electronic strobe flash exposure, a circuit is energized to quench the electronic flash.

Grass and green foliage reflect relatively high amounts of IR. To prevent a photosensor that is sensitive both to IR and to visible light from prematurely charging the capacitor and closing the shutter in outdoor photography, it is known to use a filter to block IR from the photosensor. U.S. Pat. No. 4,040,070, which is assigned to the assignee of the present invention, describes such an arrangement.

A photographer may choose to use flash illumination when taking pictures outdoors. The flash illumination provides what is commonly known as "fill-flash" to soften dark shadows, which occur in bright sunlight.

In the exposure control apparatus described in U.S. Pat. No. 4,040,070, a flash-sensing member moves the filter from its IR-blocking position whenever a flash exposure is to be taken, which normally occurs indoors. Therefore, an outdoor flash picture can be underexposed because IR from foliage can impinge upon the photosensor and cause the shutter to close prematurely.

SUMMARY OF THE INVENTION

Both flashbulbs and electronic strobe flash devices emit IR and visible light. When a flash exposure is made indoors of a subject wearing dark clothing, the subject reflects relatively little visible light. A photosensor produces only a small current in response to the reflected visible light. With respect to light areas of the subject such as light flesh tones, an exposure terminating signal is delayed if only visible light reaches the photosensor, thereby causing an overexposure of these light areas.

Clothing, regardless of color, tends to be more reflective of IR, and tends to reflect IR more uniformly than visible light. When IR, in addition to visible light, is allowed to impinge upon a photosensor, which is sensitive to both IR and visible light, a larger output current is produced.

For an indoor flash exposure of a generally dark scene, this larger current causes the exposure terminating signal to be advanced so that any light scene areas, such as light flesh tones, are not overexposed. On the other hand, for an indoor flash exposure of a generally light scene, the reflected visible light dominates the IR and the exposure terminating signal occurs at the proper time regardless of whether or not IR reaches the photosensor.

The use of IR to improve light areas of generally dark scenes exposed indoors with flash light may mean some reduction in the quality of the reproduction of darker scene areas. However, the beneficial effect on the reproduction of light areas, particularly light flesh tones, outweighs any reduction in the reproduction quality of other scene portions.

With outdoor scenes having grass and green foliage, the ambient IR is intense and can cause an underexposure, regardless of whether or not fill-flash light is used. Therefore, a conflict exists between the relative desirability of having IR impinge upon the photosensor for an indoor flash exposure of a generally dark scene, and the relative undesirability of IR reaching the photosensor for an outdoor exposure, whether or not fill-flash light is used.

I have found that when a partial IR-attenuating filter covers the photosensor for flash exposures, photographs of generally dark scenes taken indoors are improved considerably, and outdoor photographs are not compromised, compared to flash exposures made when IR is blocked from the photosensor. Furthermore, when a partial IR-attenuating filter is used, indoor flash exposures are not compromised and outdoor fill-flash exposures are improved considerably, compared to flash exposures made when no IR is blocked from the photosensor.

More specifically, I have found that a partial IR-attenuating filter that effectively passes IR between approximately 700 to 800 nanometers, and that effectively blocks IR above 800 nanometers provides highly acceptable flash exposures, whether taken indoors or outdoors. For an indoor flash exposure of a generally dark scene, the IR impinging upon the photosensor is sufficient to advance the exposure terminating signal to cause a more proper exposure of subject flesh tones. For both an indoor flash exposure of a generally light scene and an outdoor fill-flash picture, the IR reaching the photosensor does not dominate the visible light, and therefore does not advance the exposure terminating signal significantly so as to cause underexposure of the film.

Finally, if an exposure only with ambient light is to be made, a full IR-attenuating filter is used to block IR from the photosensor. This is because exposures made solely with ambient illumination normally occur outdoors, where detrimentally intense IR, which can cause an underexposure, occurs.

In accordance with the invention, a camera has a photosensor, for controlling an exposure as a function of the IR and visible light passing along a light path to the photosensor. The camera also has flash means controllable for making an exposure either by ambient illumination or by flash illumination. A first spectral filter effectively blocks IR in first and second wavelength bands and a second spectral filter effectively passes IR in the first wavelength band and blocks IR in the second wavelength band. A flash-sensing member, coupling the first and second filters to the socket, positions the first filter in the light path to the photosensor when an exposure is to be made with ambient light, thereby preventing IR in the first band from influencing the exposure. The flash-sensing member positions the second filter in the light path when a flash exposure is to be made, thereby allowing a portion of the prevailing IR to influence a flash exposure.

The invention, and its advantages, will become more apparent in the detailed description of a preferred embodiment presented below.

DESCRIPTION OF THE DRAWING

In a detailed description of a preferred embodiment of the invention presented below, reference is made to the accompanying drawing, in which.

DETAILED DESCRIPTION OF A PREFERRED EMBODIMENT

Because photographic cameras are well known, the present description will be directed in particular to elements forming part of, or cooperating more directly with, apparatus in accordance with the present invention. It is to be understood that camera elements not specifically shown or described may take various forms well known to those having skill in the art. Furthermore, although the invention is described in connection with controlling a chemical flash exposure, it is also applicable to controlling an electronic strobe flash exposure.

Figure 1:
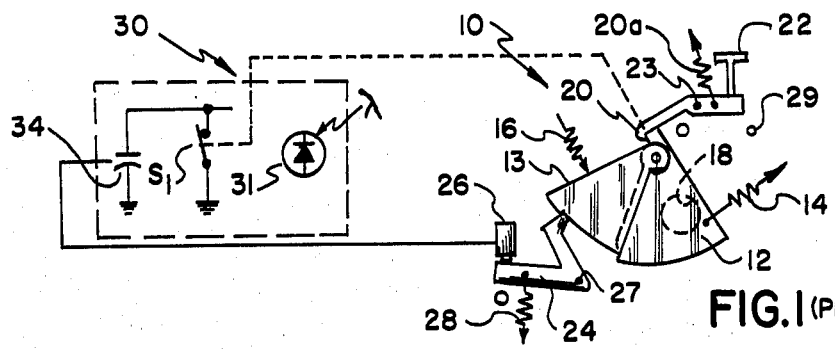
FIG. 1 is a diagrammatic view of a photoconductively controlled shutter, in which a silicon photosensor regulates an exposure interval in accordance with light intensity.

FIG. 1 shows a photoconductively controlled shutter, denoted generally 10, for regulating an exposure interval as a function of light intensity. The shutter 10 comprises blades 12 and 13, which are biased by springs 14 and 16, respectively, to uncover and cover an aperture 18 through which light passes to expose photographic film (not shown).

A pivotally mounted latch 20 latches the blade 12 in a cocked, aperture-covering position. A spring 20a biases the latch 20 into its latching position. A shutter release button 22 is mounted above the latch 20, as viewed in the drawing, for downward movement in response to actuation by a camera operator. When the operator depresses the shutter button 22, the latch 20 pivots about a pin 23 in the clockwise direction to release the blade 12. When the latch 20 releases the blade 12, the spring 14 drives the blade 12 in a counterclockwise direction to a position engaging a stop 29. In this position, the blade 12 uncovers the camera exposure aperture, and thereby effects an exposure.

A pivotally mounted armature 24, coupled to an electromagnet 26, normally retains the blade 13 in an aperture uncovering position to the left of the aperture 18. A drive spring 28 is arranged to pivot the armature 24 about a pin 27 in a counterclockwise direction. When this pivoting movement occurs, the spring 16 drives the shutter blade 13 in a counterclockwise direction to a position engaging the shutter blade 12. In this position, the blade 13 covers the aperture 18, and thereby terminates the exposure.

Figure 1A:
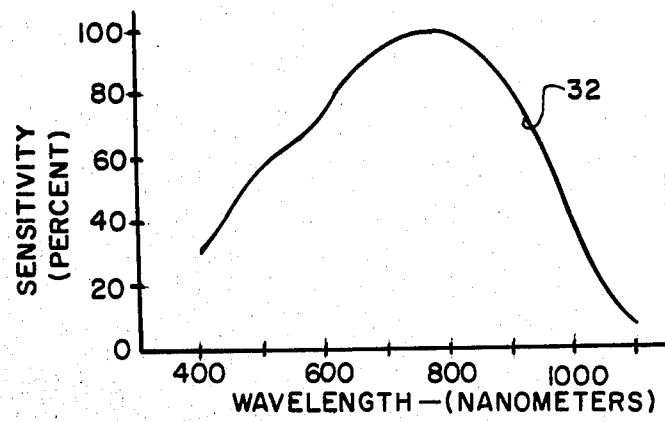
FIG. 1a illustrates the spectral sensitivity of the photosensor of FIG. 1.

An electronic circuit 30 includes a silicon photosensor 31 arranged to be exposed to light. The photosensor 31 is sensitive both to visible light (electromagnetic wavelengths in a band 400 to 700 nanometers) and IR (electromagnetic wavelengths in a band 700 to 1100 nanometers). The curve 32 of FIG. 1a illustrates the photosensor's spectral sensitivity.

The circuit 30 regulates the state of the electromagnet 26 in relation to the intensity of visible light and IR impinging upon the photosensor 31. When an exposure commences, the circuit 30 has energized the electromagnet 26, which magnetically latches the armature 24. While the armature 24 is latched, the shutter blade 13 is retained in its aperture uncovering position.

A switch $S_1$ short circuits a timing capacitor 34 prior to the time that an exposure commences. When the switch $S_1$ is open, current through the photosensor 31 charges the timing capacitor 34 at a rate proportional to the magnitude of the current. The current is proportional to the intensity of visible light and IR impinging upon the photosensor 31. If the photosensor 31 is exposed to bright visible light and intense IR, the capacitor 34 charges at a rapid rate. If the photosensor 31 is exposed to less intense visible light and IR, the capacitor 34 charges at a correspondingly lower rate.

The switch $S_1$ is opened when the blade 12 moves from its latched position so that the charging of the capacitor 34 is synchronized with the opening of the shutter 10. When the capacitor 34 is charged to a predetermined voltage, which represents a desired exposure, an exposure terminating signal is produced. The electromagnet 26 is de-energized in response to this signal. The armature 24 is no longer magnetically latched, and the spring 28 urges the armature 24 in the counterclockwise direction. When this occurs, the spring 16 drives the shutter blade 13 into its aperture-covering position, thereby terminating the exposure. The elements thus far described constitute photoconductivity controlled shutter apparatus used in the prior art.

A simplified mechanism for permitting a portion of the total prevailing IR to influence the control of flash exposures, whether the flash exposure occurs indoors or outdoors, includes a carrier for selectively moving a partial IR-attenuating filter, and a full IR-attenuating filter into and out of a light path to the photosensor 31. If an ambient exposure is to be made, the full IR-attenuating filter is positioned in the light path to block the prevailing IR from impinging upon the photosensor 31 so that IR effectively does not influence the ambient exposure. For flash exposures, the partial IR-attenuating filter is in the light path so that a portion of the prevailing IR is used to influence the exposure.

Figures 2, 3:
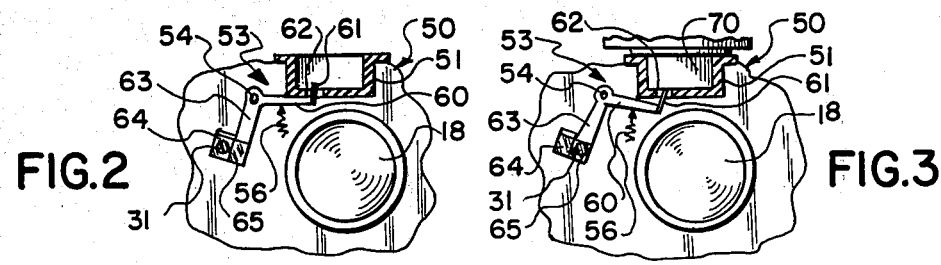
FIG. 2 is a diagrammatic view of a camera flash-sensing member showing the flash-sensing member when no photographic flash device is mounted on the camera.
FIG. 3 shows the flash-sensing member of FIG. 2 when a flash device is mounted on the camera.

FIGS. 2 and 3 are diagrammatic illustrations of a portion of a camera with which the present invention may be used. A camera housing indicated generally at 50 has a flash-receiving socket 51 adapted to receive a photographic flashbulb. The photosensor 31 is mounted in the housing adjacent the socket 51.

A bell crank lever 53 is mounted for pivotal movement about an axis 54. A spring 56 biases the lever 53 in a counterclockwise direction, as viewed in the drawing, towards the socket 51. The bell crank lever 53 has a first leg 60, which carries a sensing finger 61 that is adapted to project through an opening 62 into the flash receiving socket 51. The bell crank lever 53 has a second leg 63 to which is attached two filters 64 and 65 positioned side-by-side as shown.

Figure 4:
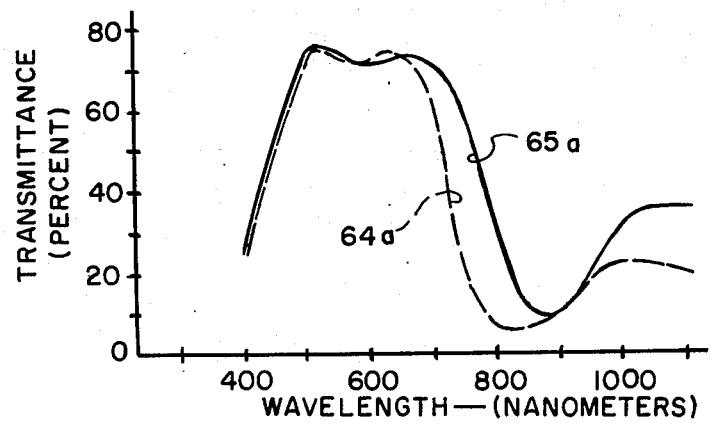
FIG. 4 illustrates the spectral transmittance of a full IR-attenuating filter and a partial IR-attenuating filter.

The filter 64 constitutes a full IR-attenuating filter, which effectively blocks electromagnetic wavelengths in a band lying between the extreme of the visible light, approximately 700 nanometers, out to at least approximately 1100 nanometers. The filter 65 constitutes a partial IR-attenuating filter, which preferably effectively passes electromagnetic wavelengths including a band between 700 nanometers out to about 800 nanometers, and effectively blocks wavelengths in the range of 800 nanometers out to at least 1100 nanometers. The curves 64a and 65a of FIG. 4 illustrate the transmittance characteristics of the filters 64 and 65, respectively.

FIG. 2 shows the position of the lever 53 when there is no flashbulb in the socket 51. In that position, the filter 64 covers the photosensor 31 and thereby effectively prevents IR from impinging upon the photosensor 31.

FIG. 3 shows the position of the lever 53 when a flashbulb 70 is in the socket 51. The flashbulb 70 engages the sensing finger 61, which in turn pivots the bell crank lever 53 in a clockwise direction against the urging of the spring 56. In that clockwise position, the filter 65 covers the photosensor 31.

Therefore, for a flash exposure, whether indoors or outdoors, IR in the range of 700 to 800 nanometers is permitted to impinge upon the photosensor 31, while IR above 800 nanometers is effectively blocked. The IR between 700 and 800 nanometers supplements the visible light (400 to 700 nanometers).

If a generally dark scene is illuminated indoors by flash light, the IR permitted to fall upon the photosensor 31, in addition to the visible light, is enough to advance the closing of the shutter 10 so that overexposure of light scene areas, such as light flesh tones, does not occur.

If a scene is illuminated outdoors with fill-flash, or a generally light scene is illuminated indoors with flash light, the IR energy falling upon the photosensor 31 does not cause closing of the shutter 10 to be advanced significantly. Accordingly, noticeable underexposure does not occur.

The invention has been described in detail with reference to the Figures; however it will be appreciated that variations and modifications are possible which are within the spirit and scope of the invention. For example, a partial IR-attenuating filter could be used to permanently cover the photosensor 31. A full IR-attenuating filter could be moved into and out of the light path to the photosensor 31 for an ambient exposure and a flash exposure, respectively. With this arrangement both the partial IR-attenuating filter and the full IR-attenuating filter serve to block IR from the photosensor 31 during an ambient exposure. Furthermore, the partial IR-attenuating filter could have any of a variety of transmittance characteristics other than the transmittance illustrated by the curve 65a, as long as the IR effectively transmitted by the partial filter is sufficient to cause the closing of the shutter 10 to be advanced so that light scene areas are more properly exposed. For example, the transmittance characteristics of the filter 65 could be relatively uniform, the transmittance percentage being lower in the band from 700 to 800 nanometers, and being higher in the band 800 to 1100 nanometers, compared to the curve 65a.

What is claimed is:

1. In a camera having exposure-determining means, including a photosensor, for controlling an exposure as a function of infrared and visible light passing along an optical path to said photosensor, and socket means for detachably receiving a photographic flash device, the improvement comprising:
    (a) a first spectral filter for effectively transmitting visible light and blocking infrared;
    (b) a second spectral filter for effectively transmitting visible light and a portion of any infrared impinging upon it; and
    (c) flash-sensing means, coupling said first and second filters to said socket means, for positioning said first filter in the optical path to said photosensor when an exposure is to be made solely with ambient illumination, and for positioning said second filter in the optical path to said photosensor when a flash exposure is to be made, whereby a flash exposure is influenced by the prevailing visible light and a portion of the prevailing infrared light, and an exposure with ambient light is influenced only by the prevailing visible light.

2. In a camera having exposure-determining means, including a photosensor, for controlling an exposure as a function of infrared and visible optical passing along an optical path to said photosensor, and socket means for detachably receiving a photographic flash device, the improvement comprising:
    (a) a first spectral filter for blocking infrared in first and second wavelength bands;
    (b) a second spectral filter for transmitting infrared in the first wavelength band, and for effectively blocking infrared in the second wavelength band; and
    (c) flash-sensing means, coupling said first and second filters to said socket means, for positioning said first filter in the light path to said photosensor when an exposure is to be made solely with ambient illumination, and for positioning said second filter in the optical path to said photosensor when a flash exposure is to be made, whereby a flash exposure is influenced by the prevailing visible light and a portion of the prevailing infrared light, and an exposure with ambient light is influenced only by the prevailing visible light.

3. In a camera having exposure-determining means, including a photosensor, for controlling an exposure as a function of infrared and visible light passing along an optical path to said photosensor, and socket means for detachably receiving a photographic flash device, the improvement comprising:
    (a) first spectral filter means for blocking infrared;
    (b) second spectral filter means for effectively passing infrared in a first wavelength zone, and for blocking infrared in a second wavelength zone; and
    (c) sensing means, coupling said first spectral filter means and said second spectral filter means to said socket means, for positioning said first spectral filter means in alignment with the optical path to said photosensor and said second spectral filter means outside the optical path when an exposure is to be made solely with ambient illumination, and for positioning said first spectral filter means outside the optical path and said second spectral filter means within the optical path when a flash device is operatively attached to said socket means, whereby a flash exposure is influenced by the prevailing visible light and a portion of the prevailing infrared, and an exposure with ambient light is influenced only by the prevailing visible light.

4. In a camera having exposure-determining means, including a photosensor, for controlling an exposure as a function of infrared and visible light passing along an optical path to said photosensor, and flash means controllable for making an exposure either by ambient illumination or by flash illumination, the improvement comprising:

(a) a first spectral filter for effectively transmitting visible light and blocking infrared;

(b) a second spectral filter for effectively transmitting visible light and a portion of any infrared impinging upon it; and (c) flash-sensing means, coupling said first and second filters to said flash means, for positioning said first filter in the optical path to said photosensor when an exposure is to be made solely with ambient illumination, and for positioning said second filter in the optical path to said photosensor when a flash exposure is to be made, whereby a flash exposure is influenced by the prevailing visible light and a portion of the prevailing infrared light, and an exposure with ambient light is influenced only by the prevailing visible light.

* * * * *